US012311569B2

(12) United States Patent
Bramley et al.

(10) Patent No.: US 12,311,569 B2
(45) Date of Patent: May 27, 2025

(54) PORTABLE SAWMILL WITH FOLDING BED

(71) Applicant: Woodland Mills Inc., Ontario (CA)

(72) Inventors: Neil Kevin Bramley, Ontario (CA); Joshua John Malcolm, Ontario (CA); Jeffrey Francis Doherty, Ontario (CA); Andreas Ismael Rifani, Ontario (CA)

(73) Assignee: Woodland Mills Inc., Port Perry (CA)

(*) Notice: Subject to any disclaimer, the term of this patent is extended or adjusted under 35 U.S.C. 154(b) by 477 days.

(21) Appl. No.: 17/964,547

(22) Filed: Oct. 12, 2022

(65) Prior Publication Data

US 2023/0036267 A1 Feb. 2, 2023

Related U.S. Application Data

(63) Continuation of application No. PCT/CA2021/000026, filed on Mar. 30, 2021.

(30) Foreign Application Priority Data

Apr. 14, 2020 (CA) .................................... 3078048
Nov. 4, 2020 (CA) .................................... 3098025

(51) Int. Cl.

| | |
|---|---|
| ***B27B 13/02*** | (2006.01) |
| ***B27B 5/10*** | (2006.01) |
| ***B27B 15/02*** | (2006.01) |
| ***B27B 29/00*** | (2006.01) |

(52) U.S. Cl.

CPC .............. *B27B 13/02* (2013.01); *B27B 29/00* (2013.01); *B27B 5/10* (2013.01); *B27B 15/02* (2013.01)

(58) Field of Classification Search

CPC .......... B27B 5/10; B27B 15/02; B27B 11/08; B27B 13/02

See application file for complete search history.

(56) References Cited

U.S. PATENT DOCUMENTS

| | | | |
|---|---|---|---|
| 144,669 | A | 11/1873 | Gross |
| 719,585 | A | 2/1903 | Hanssler |
| 1,280,629 | A | 10/1918 | Appleby |
| 1,449,576 | A | 3/1923 | Anderson |

(Continued)

FOREIGN PATENT DOCUMENTS

| | | |
|---|---|---|
| EP | 2075078 A2 | 7/2009 |
| EP | 2075078 A3 | 8/2011 |

OTHER PUBLICATIONS

PCT Notification of Transmittal of the International Search Report dated Jul. 14, 2021, and the Written Opinion dated May 6, 2021 of the International Searching Authority, International Application No. PCT/CA2021/000026, 8 pages.

(Continued)

*Primary Examiner* — Bobby Yeonjin Kim
(74) *Attorney, Agent, or Firm* — Barley Snyder

(57) ABSTRACT

A sawmill assembly includes a bed and a carriage. The bed has a pair of substantially parallel rails, and the carriage is movably supported along the rails. The bed includes an extension bed member pivotably attached to a main bed member with a combination bunk/hinge to allow an operator to fold the bed between an extended in use position and a stowed position for transporting the sawmill assembly to or from a work site with a tow vehicle.

43 Claims, 11 Drawing Sheets

(56) References Cited

U.S. PATENT DOCUMENTS

| | | | | |
|---|---|---|---|---|
| 1,612,656 | A | 12/1926 | Salin | |
| 1,923,721 | A | 8/1933 | Glenn | |
| 2,459,800 | A * | 1/1949 | Esgate | B27B 5/10 52/646 |
| 2,666,946 | A | 1/1954 | Miller | |
| 2,687,309 | A * | 8/1954 | Anders | B27B 5/10 30/379 |
| 2,810,152 | A | 10/1957 | Bruno | |
| 2,853,309 | A * | 9/1958 | Hubbard | B27B 5/10 83/651 |
| 3,377,942 | A | 4/1968 | Carbon | |
| 3,550,653 | A | 12/1970 | Baraga et al. | |
| 4,057,873 | A | 11/1977 | Bursani | |
| 4,119,340 | A | 10/1978 | Wolfe | |
| 4,131,969 | A | 1/1979 | Suska | |
| 4,275,632 | A | 6/1981 | Ross | |
| 5,213,381 | A | 5/1993 | Anderson | |
| 6,557,775 | B1 | 5/2003 | Brinson et al. | |
| 7,107,084 | B2 | 9/2006 | Duarte et al. | |
| 7,784,387 | B2 | 8/2010 | Dale et al. | |
| 2010/0000052 | A1 | 1/2010 | Chung | |

OTHER PUBLICATIONS

PCT Notification Concerning Transmittal of International Preliminary Report on Patentability, International Application No. PCT/CA2021/000026, dated Oct. 27, 2022, 6 pages.

Extended European Search Report dated Mar. 27, 2024, corresponding to Application No. 21788870.0-1017/4121265 PCT/CA2021000026, 5 pages.

* cited by examiner

PORTABLE SAWMILL WITH FOLDING BED

CROSS-REFERENCE TO RELATED APPLICATIONS

This application is a continuation of PCT International Application No. PCT/CA2021/000026, filed on Mar. 30, 2021, which claims priority under 35 U.S.C. § 119 to Canadian Patent Application No. 3078048, filed on Apr. 14, 2020, and to Canadian Patent Application No. 3098025, filed on Nov. 4, 2020.

FIELD OF THE INVENTION

The present invention relates generally to the field of sawmills. More particularly, the present invention relates to portable sawmills having a cutting head mounted to a carriage movable along rails supported on a bed, wherein the saw head comprises a band saw cutting blade.

BACKGROUND

A sawmill typically includes three main components, namely, a bed, a carriage, and a saw head. The bed is adapted to support a log extending horizontally along the bed. The carriage is mounted to the bed for horizontal movement along the length of the log, and the saw head is mounted to vertical posts on the carriage. The vertical posts of the carriage permit vertical movement of the saw head relative to the carriage, and the carriage is adapted for horizontal movement along the bed. Typically, the carriage rides on a section of track including a pair of parallel rails. The saw head typically includes a band saw blade to cut the log as the carriage is moved horizontally along the bed. U.S. Pat. No. 4,275,632 to Ross, and U.S. Pat. No. 7,784,387 to Dale disclose examples of such a sawmill.

A problem with the sawmills disclosed in the U.S. '632, and '387 patents, and others like them, is that in order to be transportable, conventional sawmills are provided with a track that is limited in length. In particular, trailerable sawmills have tracks limited to lengths that can be fit on trailers that have overall lengths of at most 16 to 20 feet, since longer trailers become difficult to maneuver, or may not comply with local laws. Accordingly, it is common for such trailerable sawmills to have a bed and track that is no longer than about 10 feet, which limits the length of logs it can be used with to about 10 feet 4 inches.

U.S. Pat. No. 719,585 to Hanssler disclosed one attempt for extending a track in a portable sawmill using hinges to hingedly attach track-sections to both ends of a track. The folding track-sections are capable of swinging upwardly to rest on top of the machine when not in use. Hanssler noted that in this way a track is formed which when in its folded position will be of substantially the same length as the machine-frame and when in its position for use will be long enough for all of the ordinary purposes for which the portable sawmill is designed. However, a problem with the Hanssler sawmill is that it is designed with a circular saw fixedly mounted on the side of the portable sawmill, wherein a separate carriage riding on the track is required to move workpiece material, such as a log, to and through the circular saw for cutting. Additional problems associated with the Hanssler sawmill relate to the simple hinged attachment of the track-sections to the track which cause issues for levelling and aligning of the rails. Such unlevelled and/or misalignment rails would make it difficult if not impossible to maintain a precise cut through the workpiece material, along the length of the workpiece material, with the horizontal band saw sawmills of the type described above, namely those having a horizontal cutting head mounted to a carriage adapted to ride on rails. This is not a problem Hanssler needed to contend with because Hanssler's sawmill employed a vertically oriented circular saw, meaning that bumps, or other changes in elevation in the track would not translate into changes in the cut being made to the workpiece material. However, it will be appreciated that in the case of horizontal band saw sawmills, such defects in the rails will translate to the cuts in the workpiece material by the band saw blade.

SUMMARY OF THE INVENTION

A sawmill assembly includes a bed and a carriage. The bed has a pair of substantially parallel rails, and the carriage is movably supported along the rails. The bed includes an extension bed member pivotably attached to a main bed member with a combination bunk/hinge to allow an operator to fold the bed between an extended in use position and a stowed position for transporting the sawmill assembly to or from a work site with a tow vehicle.

BRIEF DESCRIPTION OF THE DRAWINGS

Reference will now be made to the embodiments of the present invention with reference, by way of example only, to the following drawings in which.

DETAILED DESCRIPTION OF THE EMBODIMENTS

The present invention is described in more detail with reference to exemplary embodiments thereof as shown in the appended drawings. While the present invention is described below with reference to the embodiments, it should be understood that the present invention is not limited thereto. Those of ordinary skill in the art having access to the teachings herein will recognize additional implementations, modifications, and embodiments which are within the scope of the present invention as disclosed and claimed herein.

Figure 1:
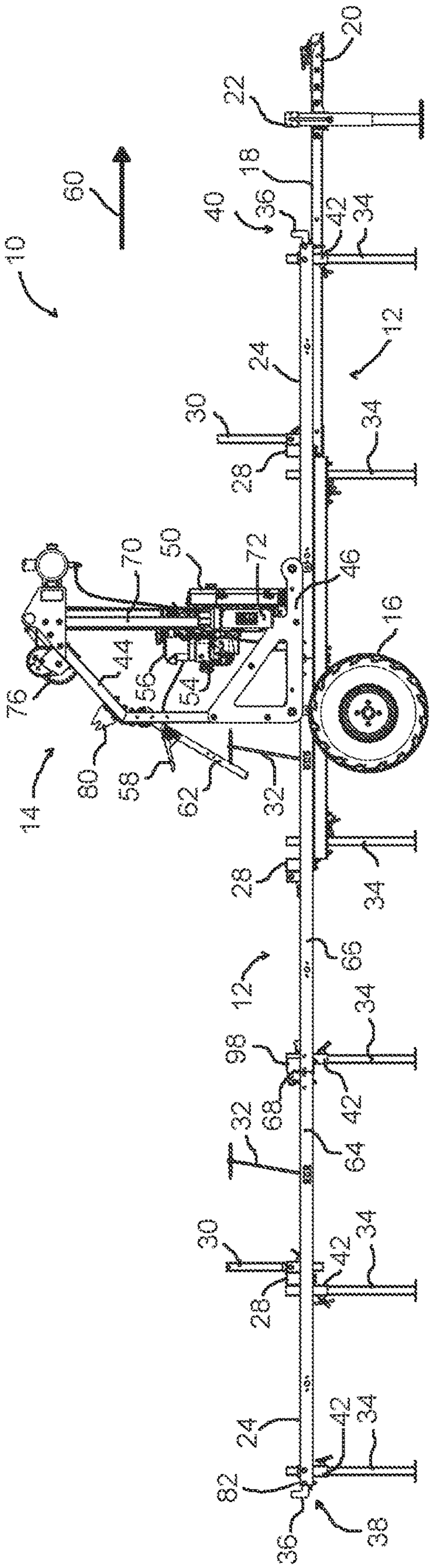
FIG. 1 is a side view of a sawmill according to an embodiment of the present invention, showing a bed having an extension bed member pivotably attached to a main bed member, wherein the extension bed member is in an extended, in use position.
Figure 2:
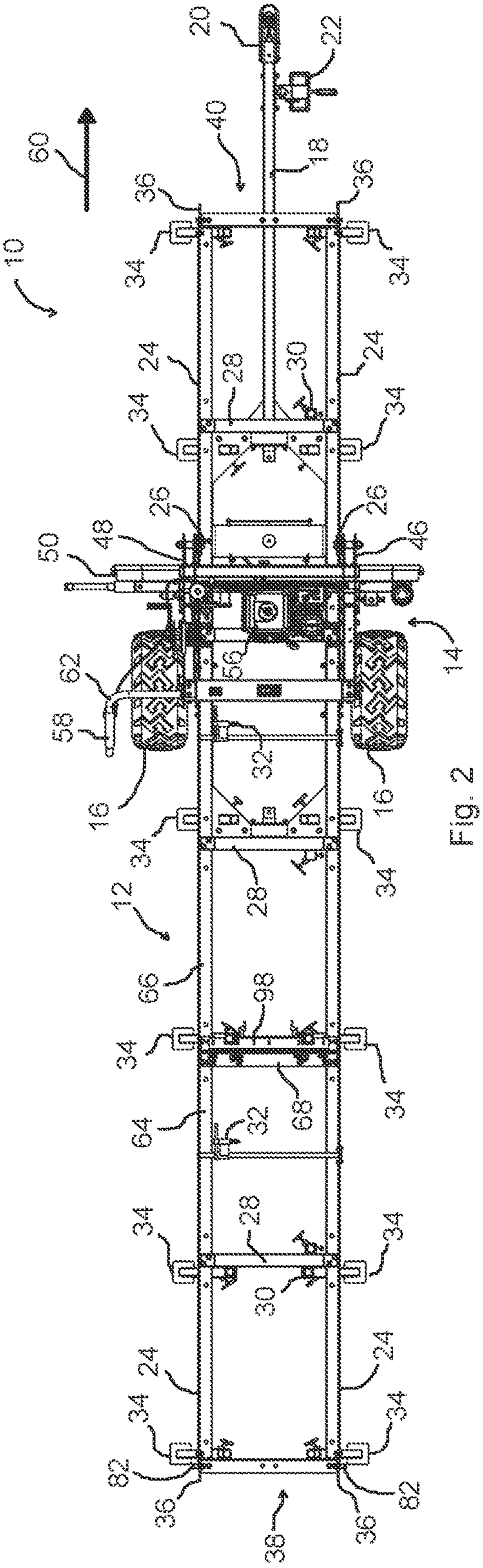
FIG. 2 is a top view of the sawmill of FIG. 1.
Figure 3:
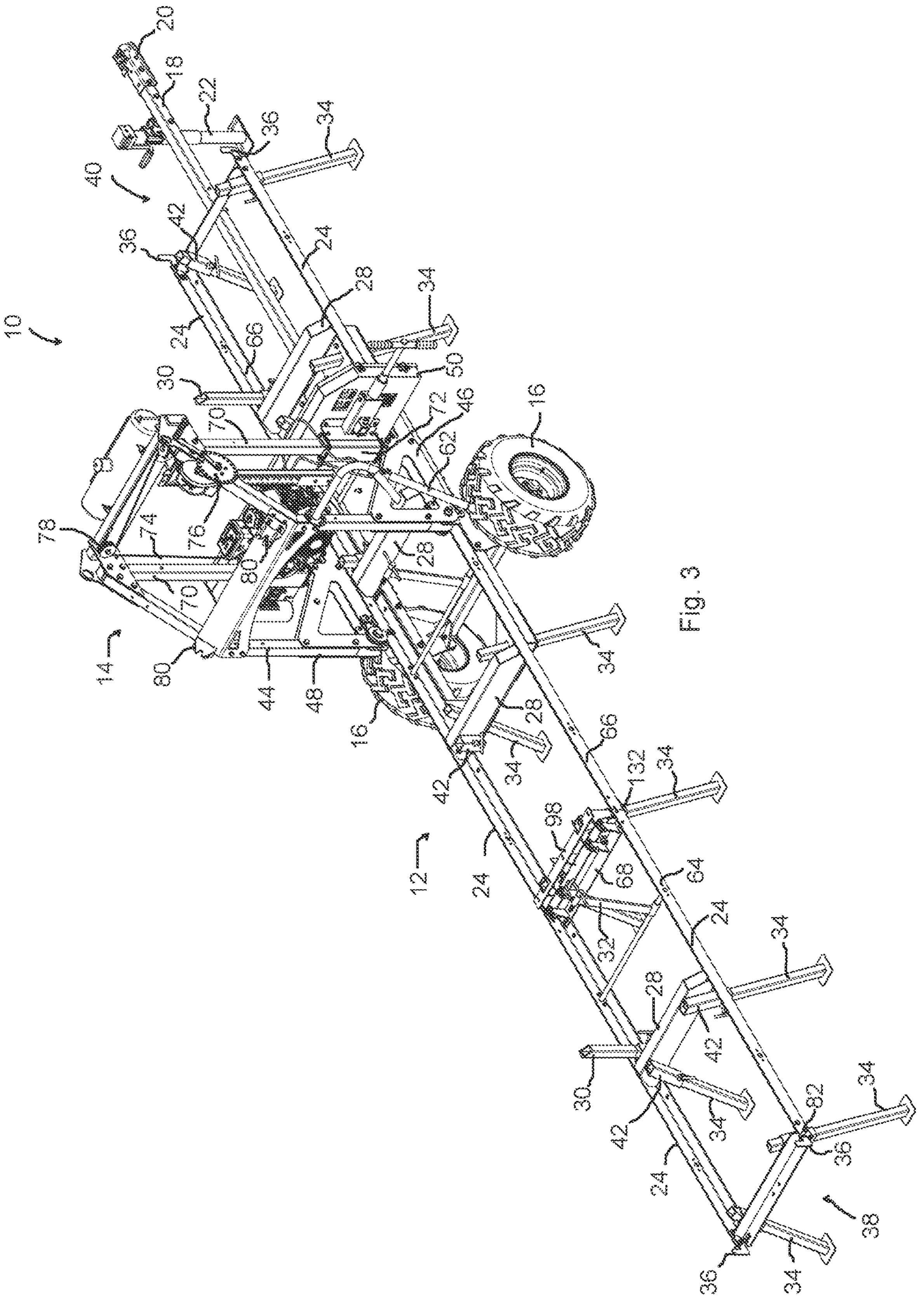
FIG. 3 is a perspective view of a mirror image of the sawmill of FIG. 1.

A sawmill apparatus 10 according to an embodiment of the present invention is shown in FIGS. 1 to 3, in an in-use configuration. The sawmill apparatus 10 includes a bed 12 and a carriage 14. In an embodiment, the bed 12 may be in the form of a trailer with one or more pairs of road, or off-road wheels 16, a tongue 18, a hitch 20, and a trailer jack 22, as well as any other elements necessary or desirable to allow the sawmill apparatus 10 to be towed by a tow vehicle, in a conventional manner. The bed 12 has a pair of substantially parallel rails 24, and the carriage 14 is movably supported along the rails 24, on carriage wheels 26 as shown. In an embodiment, the rails 24 may be L-shaped in cross-section, defining vertical portions comprising wheel contacting support surfaces for the carriage wheels 26, and horizontal portions for attachment to the bed 12. Furthermore, the rails 24 may be formed from a plurality of rail sections (not shown).

Several log bunks 28 are positioned between the rails 24 and arranged in the bed 12 to support a workpiece material (not shown) thereon. By way of example, the workpiece material may be made from wood, such as a log. Log bunks 28 are, in an embodiment, structural components of the bed 12 that support the workpiece material during the milling/sawing operation. The workpiece material rests on the log bunks 28 and in turn they carry the entire weight of the workpiece material. In an embodiment, the log bunks 28 may also add to the overall structural strength of the bed 12 as they tie into the rails 24 to help keep them true and square. It has been found that providing a level square bed 12 is desirable for achieving wood boards of consistent thickness since the carriage 14 follows along the rails 24.

In an embodiment, one or more log supports 30 and clamps 32 are also provided on the bed 12 and configured to secure the workpiece material to the bed 12 between the rails 24. As will be appreciated, the log supports 30 and clamps 32 may be used to help prevent movement of the workpiece material during operation of the sawmill apparatus 10. Additionally, a plurality of adjustable feet 34 may be provided under the bed 12 and configured to permit a sawmill operator to level the bed 12 during installation and setup and provide uniform support for the rails 24 when the bed 12 is installed on uneven ground. In an embodiment, the bed 12 will also be provided with carriage stops 36 at both ends of the rails 24 to ensure that the carriage 14 does not inadvertently roll off of the rails 24 at one end 38 or the other 40. In an embodiment also, the log supports 30 and clamps 32 may be removably, and slidably retained in holders 42, to allow their heights above the rails 24 to be adjusted. In this way, the heights of the log supports 30 and clamps 32 may be individually adjusted by the operator, or they may be individually removed from the bed 12, as needed so as not to interfere with the movement of the carriage 14 along the rails 24 between the one end 38 of the bed 12 and the other end 40 of the bed 12. Similarly, the adjustable feet 34 may be removably and slidably retained in holders 42, to allow their lengths below the rails 24 to be adjusted.

In an embodiment, the bed 12 may be configured as a kit of parts, to be assembled by the operator without the need for specialized tools.

With continued reference to FIGS. 1 to 3, the carriage 14 has a frame 44 with two sides 46, 48 that straddle the bed 12, and is moveably supported along the rails 24 on the carriage wheels 26, between the one end 38 and the other end 40. The carriage wheels 26 may include annular grooves to limit lateral movement on the rails 24. In an embodiment, the frame 44 is configured to carry a saw head 50 attached or mounted thereto. In an embodiment, the saw head 50 includes a band saw, having a blade 52 adapted to cut the workpiece material, a motor 54 (i.e. electric or internal combustion motor) to drive the band saw, and other components that may be necessary or desirable to operate and control the band saw, such as, for example, a fuel tank 56, and a throttle 58.

The saw head 50 is configured to cut the workpiece material supported on the bed 12, as the carriage 14 is moved along the rails 24 in at least one direction 60, for example, from the one end 38 of the bed 12 to the other end 40 of the bed 12. Of course, it will be appreciated that the saw head 50 may also be configured to cut the workpiece material in a direction opposite to the at least one direction 60. In an embodiment, the saw head 50 may be configured to cut the workpiece material in both directions, for example, by providing the blade 52 with cutting surfaces facing both the one end 38 and the other end 40. All such embodiments are comprehended by the present invention.

In an embodiment, the carriage 14 may be configured to be moved along the rails 24 by the operator between the one end 38 and the other end 40, while the band saw is on and driving the blade 52. For example, the operator may apply force to the carriage 14 to cause it to move in the one direction 60 or the opposite direction. A handle 62 may be provided on the frame 44 to facilitate the pushing or pulling the carriage 14 by the operator.

In an embodiment, the bed 12 includes an extension bed member 64 which is pivotably attached to a main bed member 66 with a combination bunk/hinge assembly 68. As shown, the main bed member 66 may include the road or off-road wheels 16, tongue 18, hitch 20, trailer jack 22, as well as any other elements necessary or desirable to allow the sawmill apparatus 10 to be towed by a tow vehicle, in a conventional manner.

According to an embodiment of the present invention, the saw head 50 is attached to the frame 44 together with an element to raise or lower the saw head 50 in the carriage 14 along a vertical axis of the carriage 14, with the blade 52 remaining substantially perpendicular to the vertical axis of the carriage 14. In an embodiment, the raising and lowering of the saw head 50 may be achieved by slidably mounting the saw head 50 to a pair of vertically oriented posts 70 at the sides 46, 48 of the frame 44, and operatively connecting the sliding saw head 50 to a winch and pulley assembly. By way of example, as best seen in FIG. 3, an element to raise or lower the saw head 50 may include at least one guide sleeve 72 adapted to slidingly accommodate a vertically oriented post 70 on one side 46 of the frame 44. In an embodiment, the saw head 50 includes two guide sleeves 72 adapted to slidingly accommodate vertically oriented posts 70 on both sides 46 and 48 of the frame 44. A cable 74 connects a winch 76 and pulleys 78 mounted to the frame 44, to the sliding saw head 50 to allow the operator to raise and lower the saw head 50 by manipulating the winch 76. It will be appreciated that raising or lowering the saw head 50 translates into raising or lowering of the blade 52 of the saw head 50 above the bed 12, enabling the operator to adjust the height of the blade 52 above the bed 12.

Accordingly, the operator may manipulate the element to raise or lower the saw head 50 to cut the workpiece material supported on the bed 12 at a desired height relative to the bed 12. In this way, the operator may cut a piece from the workpiece material, such as for example, a flat board, having a desired thickness. However, the person skilled in the art will recognize other known ways of raising and lowering the saw head 50. All such other known ways of raising or lowering the saw head 50 are comprehended by the present invention.

In an embodiment, the carriage 14 may also be configured as a kit of parts, to be assembled by the operator without the need for specialized tools.

In an embodiment, the bed 12 and the carriage 14 may be configured as a kit of parts, to be assembled by the operator into a sawmill assembly, configured to mount the saw head 50. It is contemplated that the combination bunk/hinge assembly 68 and the sawmill assembly may be provided as standalone items, to enable operators to build, retrofit, or modify sawmills in accordance with the present invention. In an embodiment, however, the kit of parts may also include the saw head 50, to permit the operator to assemble a complete sawmill assembly 10. All such embodiments are comprehended by the present invention.

Accordingly, it will be appreciated that operation of the sawmill apparatus 10 in the configuration shown in FIGS. 1 to 3 permits the operator to make substantially horizontal cuts through the workpiece material by pushing or pulling the carriage 14 from the one end 38 to the other end 40 of the bed 12. Furthermore, it will be appreciated that by using the sawmill apparatus 10 in the configuration shown in FIGS. 1 to 3 to make a pair of sequential, horizontal cuts in the workpiece material, and manipulating the winch 76 to lower the saw head 50 between the pair of cuts, the operator may cut a piece from the workpiece material, such as for example, a flat board, having a desired thickness.

Although, the saw head 50 according to an embodiment of the present invention includes a band saw having a blade 52 oriented substantially perpendicular to a vertical axis of the carriage 14, it is contemplated that the band saw may be replaced with another known type of saw such that the blade 52 is held in the carriage 14 substantially perpendicular to a vertical axis of the carriage 14. By way of example only, such other known types of saw may include a chain saw, a reciprocating saw, or a circular saw. All such embodiments are comprehended by the present invention.

With reference now to FIGS. 4 to 9 the sawmill apparatus 10 is shown in a stowed, transportable configuration, which is ready to be hooked up to a hitch ball, for example, on a tow vehicle, such as a pickup truck (not shown), in a conventional manner, and towed to or from a work site. In the example shown in the figures, the longitudinal axis of the extension bed member 64 is at an angle 27° relative to the longitudinal axis of the main bed member 66, when the extension bed member 64 is in the stowed position. In an embodiment, the angle between the longitudinal axis of the extension bed member 64 and the longitudinal axis of the main bed member 66 may be in a range of 26° to 28°, when the extension bed member 64 is in the stowed position. However, one of the reasons for providing an extension bed member 64 that can be folded to the stowed position is to increase the maneuverability of the sawmill apparatus 10 when being transported. It has been found that depending on the design of the sawmill apparatus 10, the benefit of increased maneuverability may be accomplished by providing the angle between the longitudinal axis of the extension bed member 64 and the longitudinal axis of the main bed member 66 in a range of 90° to 0°, wherein an angle of 180° has the extension bed member 64 fully extended to the in use position, 90° has the extension bed member 64 standing upright, and 0° has the extension bed member 64 folded back fully on the main bed member 66. All such embodiments are comprehended by the present invention.

In an embodiment, when the extension bed member 64 is in the in use position, the longitudinal axis of the extension bed member 64 extends substantially parallel to the longitudinal axis of the main bed member 66, and the wheel contacting support surfaces of the rails 24 of the extension bed member 64 are aligned with the wheel contacting surfaces of the rails 24 of the main bed member 66.

Figure 4:
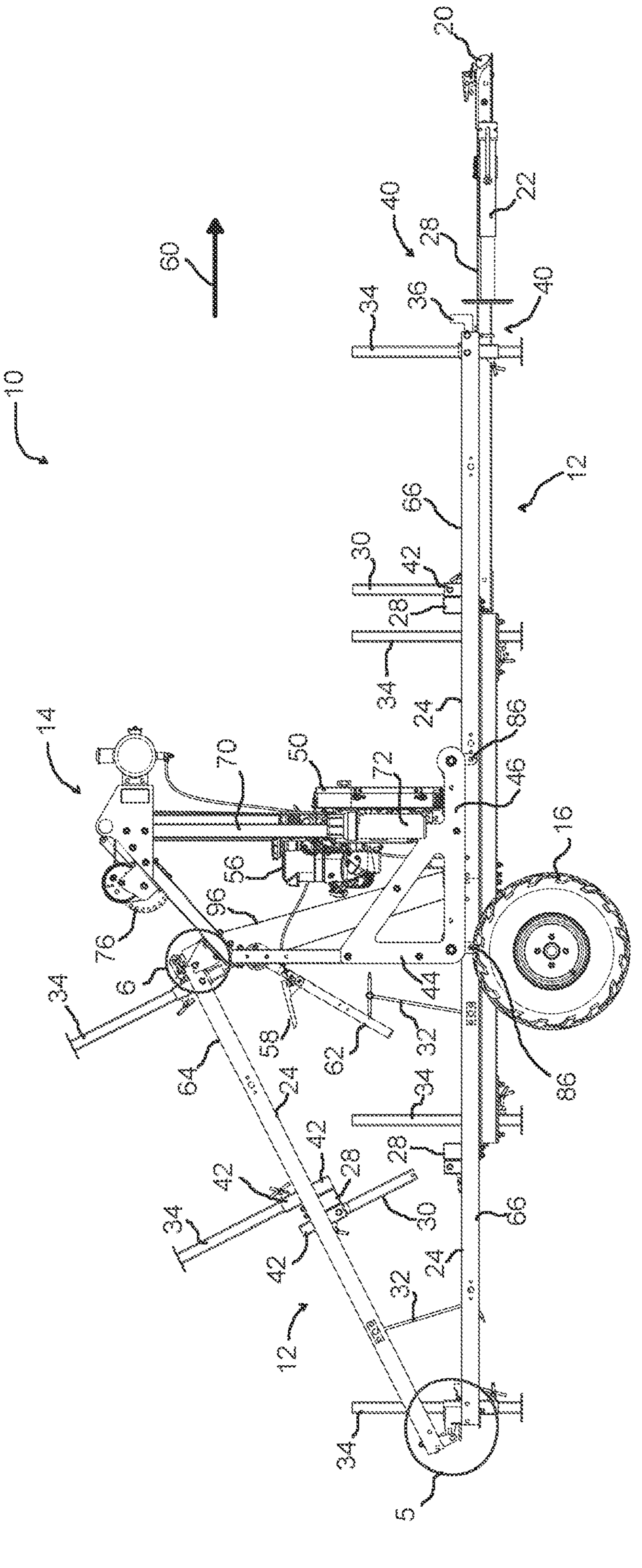
FIG. 4 is a side view of the sawmill of FIG. 1, wherein the extension bed member is in a folded, stowed position.

As best seen in FIG. 4, when the sawmill apparatus 10 is to be transported to or from a work site by being towed behind a tow vehicle, the extension bed member 64 is pivoted up and back towards the carriage assembly 14 such that the one end 38 engages the carriage assembly 14.

Figure 6:
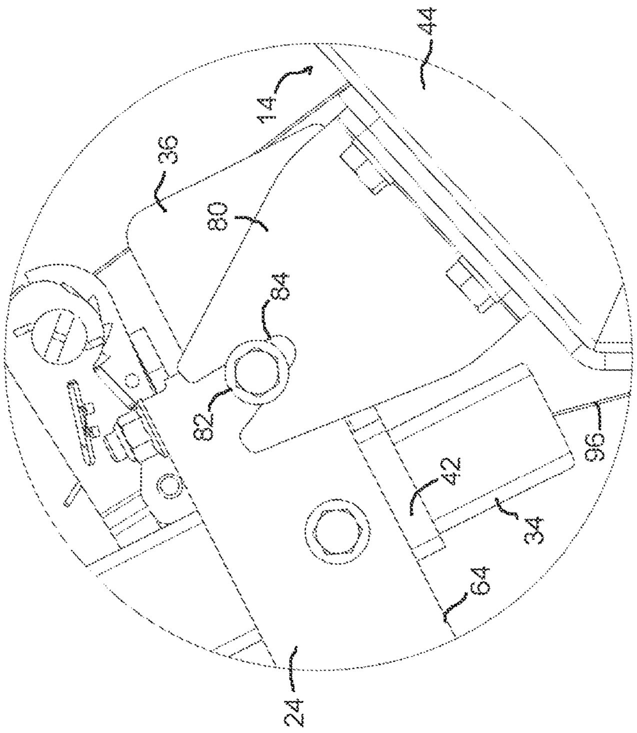
FIG. 6 is another detail of the sawmill of FIG. 4 showing an enlarged side view of a latch comprising a striker peg engaging a catch member.

In an embodiment, the one end 38 may include an element to releasably secure the one end 38 to the carriage assembly 14, when the extension bed member 64 is in the stowed position, as best seen in FIG. 6. By way of example, the element may include a latch having a catch member 80 on the carriage assembly 14, and a striker peg 82 on the one end 38. In an embodiment, two such latch members may be provided, one on each side of the sawmill apparatus 10. In an embodiment, the striker peg 82 may have a cylindrical shape sized to engage a tapered slot 84 in the catch member 80. As will be appreciated the tapered slot 84 can help guide the striker peg 82 to its resting position within the pit of the tapered slot 84. Although the example shown shows the striker peg 82 attached to the extension bed member 64 and the catch member 80 attached to the carriage assembly 14, it is contemplated that the striker peg 82 may be attached to the carriage assembly 14, with the catch member 80 attached to the extension bed member 64. Additionally, the catch member 80 may be provided with an element (not shown) for releasably retaining the striker peg 82 within the tapered slot 84, wherein the element allows the striker peg 82 to enter the tapered slot 84 but requires an action by the operator to allow the striker peg 82 to exit the tapered slot 84. All such embodiments are comprehended by the present invention. What is important is that the one or more latches may be used to releasably secure the one end 38 of the carriage assembly 14 when the extension bed member 64 is in the stowed position.

Figure 7:
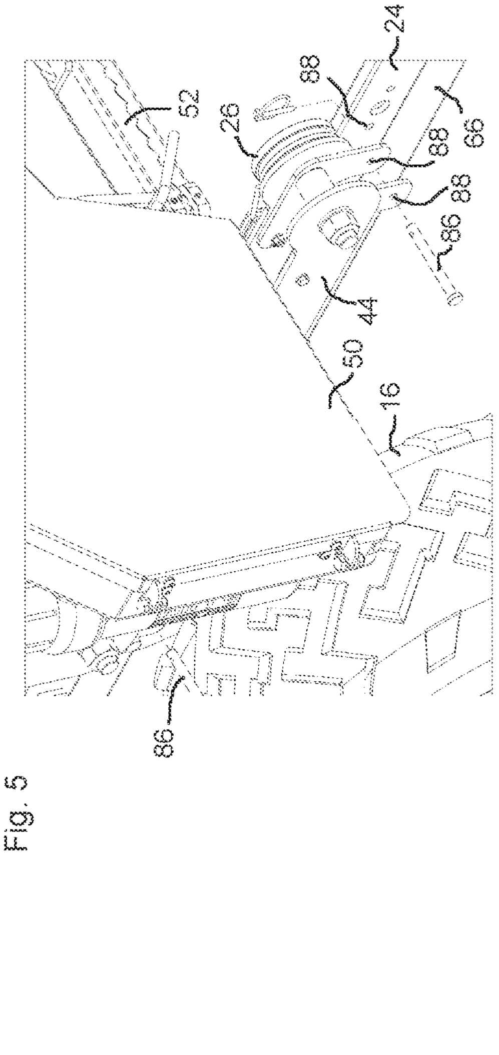
FIG. 7 is a perspective view of a portion of the sawmill of FIG. 4 showing a carriage stop.

In an embodiment, as best seen in FIG. 7, the sawmill apparatus 10 may include an element to releasably lock the carriage assembly 14 in position relative to the main bed member 66 when the extension bed member 64 is in the stowed position. By way of example, the locking means may include a lock pin 86, and matching apertures 88 in the frame 44 at the carriage wheels 26, and in a rail 24. In this way the operator may pass the lock pin 86 through apertures in the frame and the rail 24, essentially fastening the carriage assembly 14 to the main bed member 66, thereby preventing horizontal movement of the carriage assembly 14 along the rails 24 of the main bed member 66. The lock pin 86 will also help prevent the carriage assembly 14 from lifting up from the rails 24, for example while the sawmill apparatus 10 is being transported over a rough or bumpy road.

Advantageously, securing the extension bed member 64 to the carriage assembly 14 in this manner allows the extension bed member 64 to be used as a brace or truss, which helps prevent the carriage assembly 14 from tipping over during transport. As will be appreciated, frame 44 of the carriage assembly 14, the portion of the main bed member 66 extending between the carriage assembly 14 and the combination bunk/hinge assembly 68, and the extension bed member together form a triangle, which is structurally robust.

Figure 5:
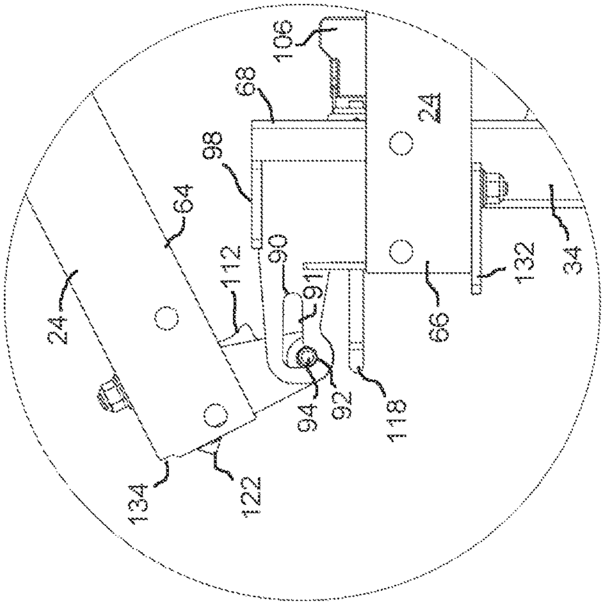
FIG. 5 is a detail of the sawmill of FIG. 4 showing an enlarged side view of the hinged attachment of the extension bed member to the main bed member with a combination bunk/hinge assembly.

As seen in FIG. 5, the combination bunk/hinge assembly 68 includes a special shaped hinge slot 90 allowing the user to pull the extension bed member 64 away from the main bed member 66 into a pivot position which facilitates folding of the extension bed member 64 into the stowed position. The hinge slot 90 includes a detent 92 at one end that catches a hinge pin 94 when the operator pulls the extension bed member 64 away from the main bed member 66. The detent 92 provides a shoulder for the hinge pin 94 to bear against as the operator folds the extension bed member 64 back onto the carriage assembly 14 to prevent the hinge pin 94 from sliding in the hinge slot 90 during the folding step. As will be appreciated, this makes it easier for the operator to fold the extension bed member 64 back on to the carriage assembly 14 and engage the catch member 80 with the striker peg 82. In an embodiment, the hinge slot 90 has a slide portion 91, adapted to allow the hinge pin 94 to slide there along, so that the extension bed member 64 may be pulled away from the main bed member 66 by a predetermined distance before the hinge pins 94 drop into the respective detents 92. In an embodiment, each detent 92 is a curved portion at the end of the slide portion 91 of the hinge slot 90, which is oriented to allow the hinge pin 94 to drop into it, when the extension bed member 64 is pulled away from the main bed member 66 during folding of the extension bed member 64 from the in use position to the stowed position. Each detent 92 is further configured to allow the hinge pin 94 to pop out of it and slide along the slide portion 91 of the hinge slot 90, when the extension bed member 64 is pushed toward the main bed member 66 during unfolding of the extension bed member 64 from the stowed position to the in use position and securement to the main bed member 66.

Figure 8:
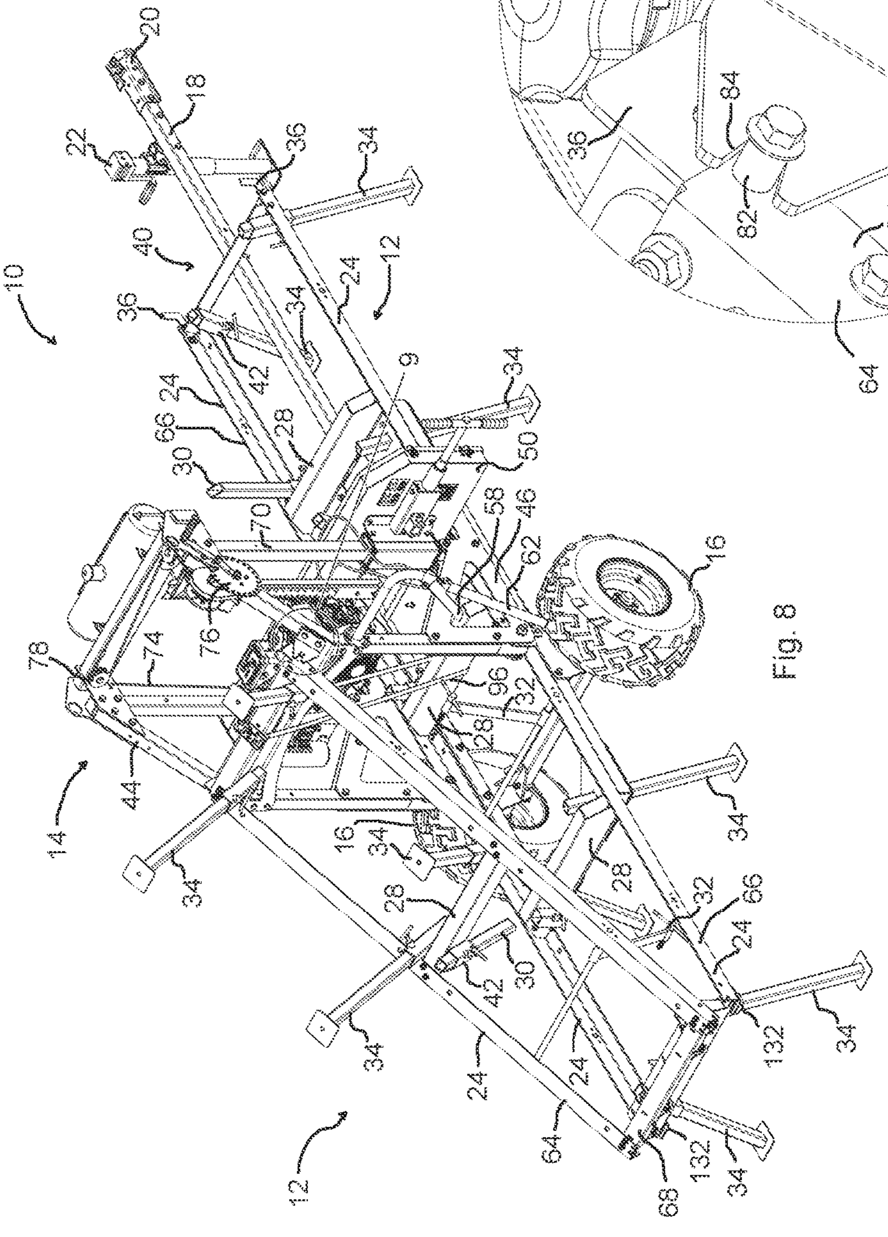
FIG. 8 is a perspective view of the sawmill of FIG. 3.
Figure 9:
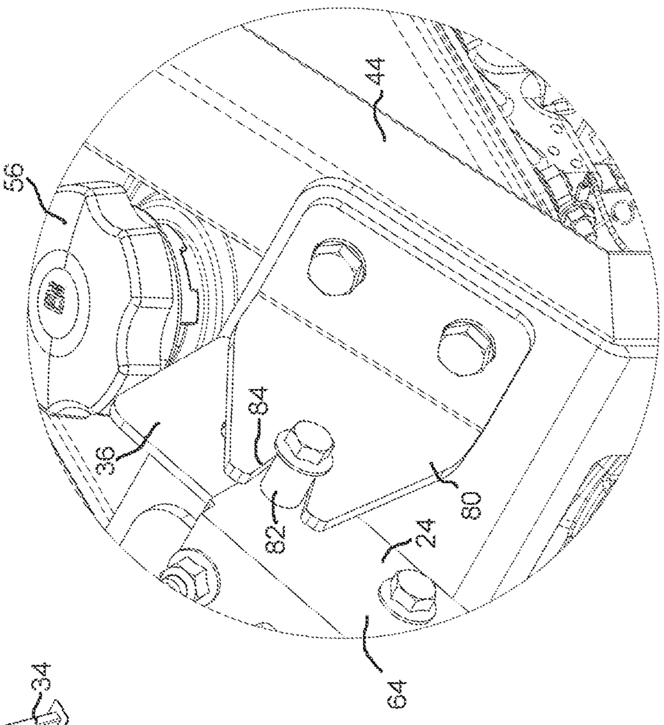
FIG. 9 is a detail of the sawmill of FIG. 8 showing an enlarged perspective view of the latch of FIG. 6.

With reference now to FIGS. 8 and 9, the extension bed member 64 may be secured in the stowed position with one or more striker pegs 82 engaged by one or more relatively positioned catch members 80, using a ratchet strap 96, or the like. However, other elements for securing the extension bed member 64 in the stowed position that will be available to persons skilled in the art are comprehended by the present invention, including ropes, belts, bungee cords, and the like.

Figure 10:
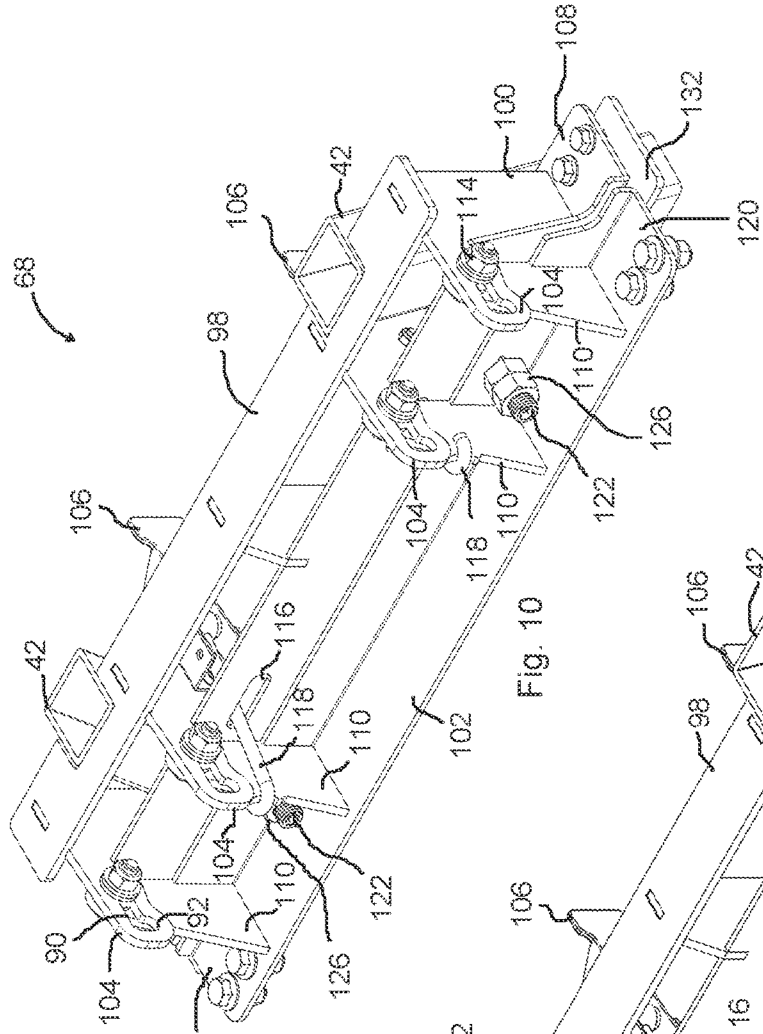
FIG. 10 is a rear perspective view of the combination bunk/hinge assembly of FIG. 5.
Figure 11:
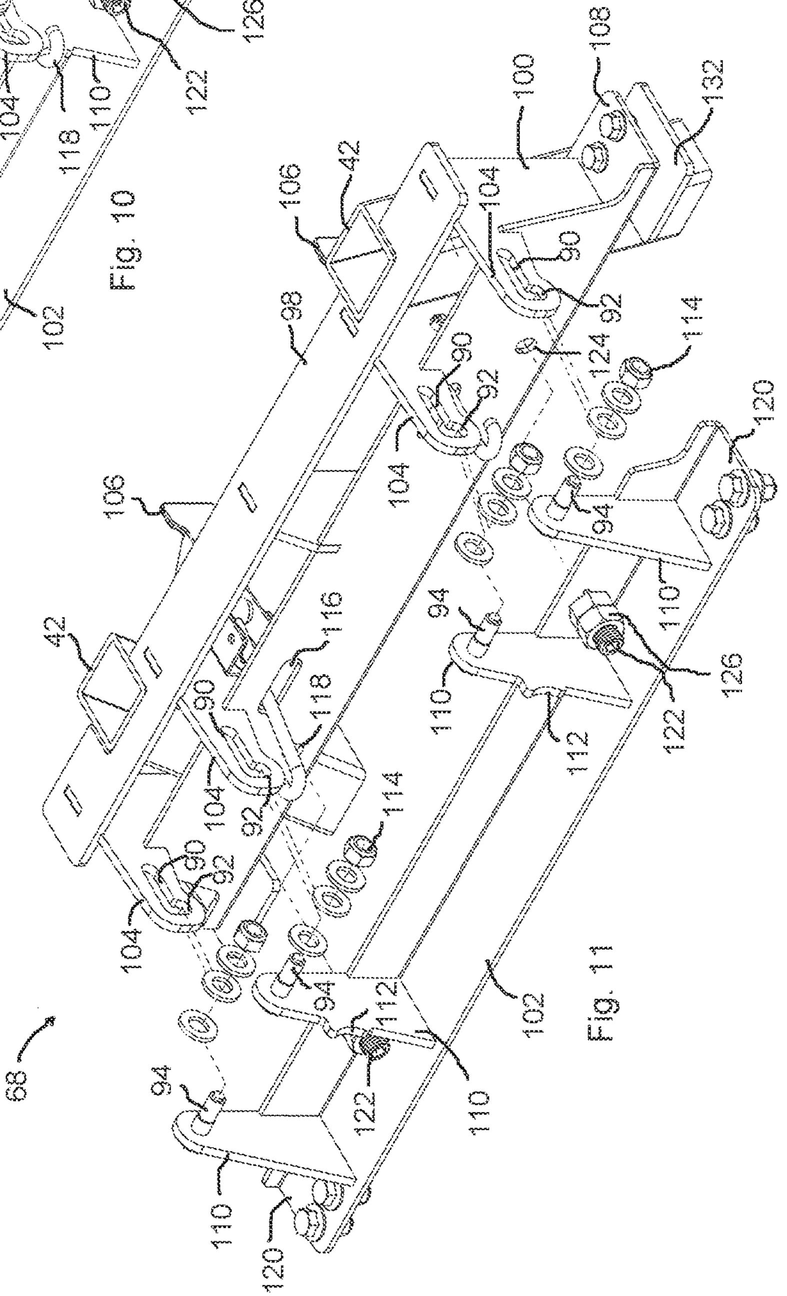
FIG. 11 is a rear perspective view of the combination bunk/hinge assembly of FIG. 10 disassembled to illustrate an extension bed member side bunk/hinge member, and a main bed member side bunk/hinge member.
Figure 12:
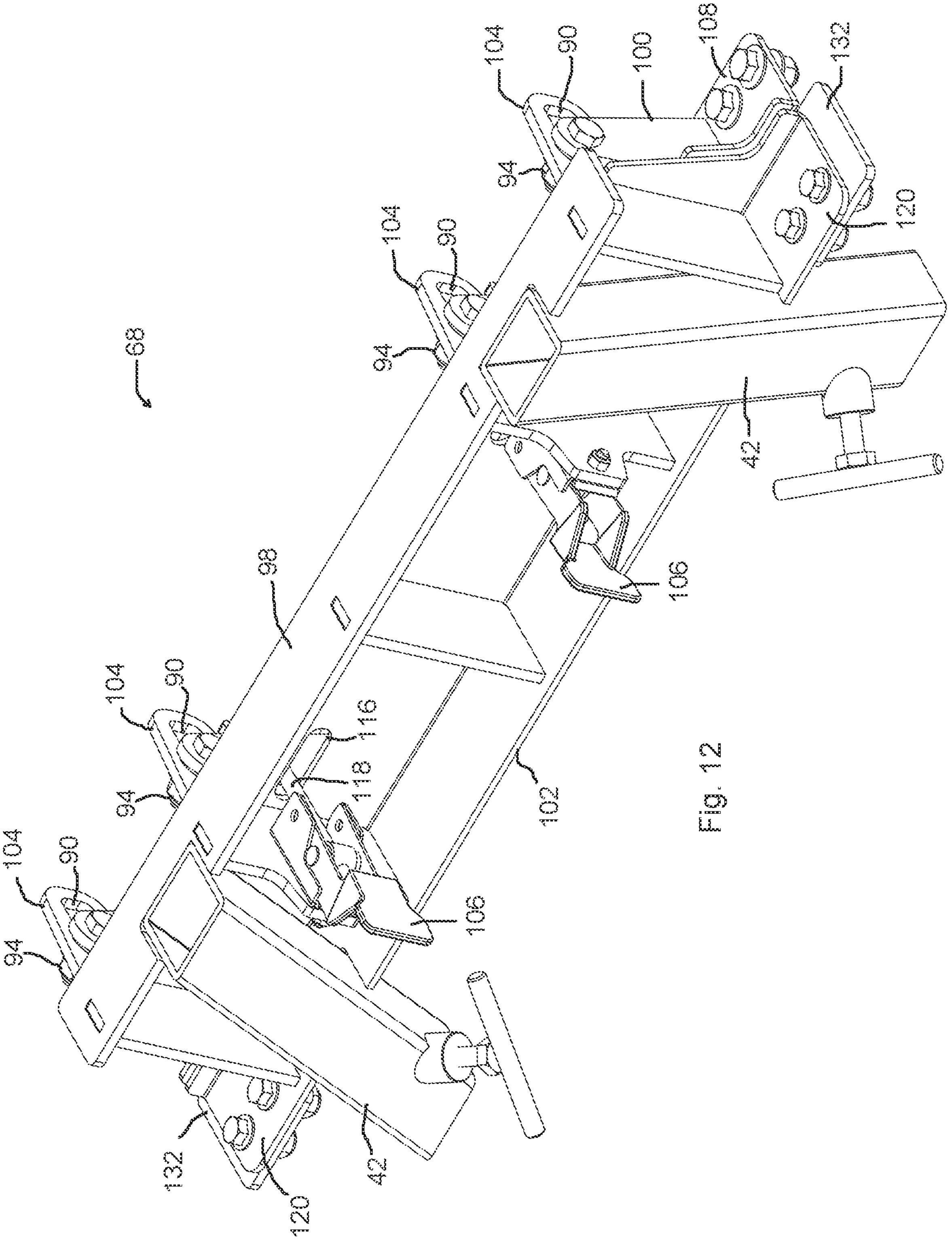
FIG. 12 is a front perspective view of the combination bunk/hinge assembly of FIG. 10.

With reference now to FIGS. 10 to 12, an embodiment of the combination bunk/hinge assembly 68 is shown apart from the bed 12. Advantageously, the combination bunk/hinge assembly 68 includes a bunk surface 98 for supporting a workpiece material, such as a log, rested on top of it. In an embodiment, the bunk surface 98 is substantially level with support surfaces on the log bunks 28, when the extension bed member is in the in-use position. In this way, the combination bunk/hinge assembly 68 functions as another log bunk 28, and together with the other log bunks 28 in the bed 12 they can carry the entire weight of the workpiece material. Like the log bunks 28, the combination bunk/hinge assembly 68 may also add to the overall structural strength of the bed 12 as it ties into the rails 24. Accordingly, the combined bunk/hinge assembly 68 combines the features of a hinge with a log bunk, among other features.

As can be seen in FIG. 10, the combination bunk/hinge assembly 68 has two halves that are pivotably attached together. The two halves are more clearly seen in the disassembled view shown in FIG. 11. A first hinge half 100 is configured for attachment to the main bed member 66, and a second hinge half 102 is configured for attachment to the extension bed member 64. In this example, the first hinge half 100 has a bunk surface 98 on its top for supporting a workpiece material, such as a log, four first hinge members 104, each having a hinge slot 90, a pair of draw latches 106, and a pair of attachment flanges 108 for attaching the combination bunk/hinge assembly 68 to the main bed member 66. In an embodiment, the first hinge half 100 may also include a pair of holders 42 for slidably retaining adjustable feet 34.

In the embodiment of the invention shown in the figures, the rails 24 of the extension bed member 64 are spaced apart by the same distance as the rails 24 of the main bed member 66. However, this is not essential, as the rails of the extension bed member 64 may be spaced apart by a different distance than the rails of the main bed member 66, whether greater or lesser, in other embodiments.

The embodiment of the invention shown in the figures also shows the bunk surface 98 of the combination bunk/hinge assembly 68 spanning a major portion of the distance between the rails 24. In an embodiment, the bunk surface 98 of the combination bunk/hinge assembly 68 spans at least 50% of the distance between the rails 24 of the main bed member 66 or the extension bed member 64. In an embodiment, the bunk surface 98 of the combination bunk/hinge assembly 68 spans at least 90% of the distance between the rails 24 of the main bed member 66 or the extension bed member 64. Furthermore, it is contemplated that the bunk surface 98 may be configured to be greater than the distance between the rails 24 of the main bed member 66 or the extension bed member 64.

The draw latches 106 may be configured to secure the second hinge half 102 to the first hinge half 100 when the extension bed member 64 is pivoted out into the extended, horizontal, in use position, as will be described in more detail below.

In this example, the second hinge half 102 has four second hinge members 110, each carrying a hinge pin 94. Additionally, the two center-most second hinge members 110 also define draw latch saddles 112. In an embodiment, the hinge pins 94 may be threaded bolts secured through hinge slots 90 with nuts 114. In an embodiment, the second hinge half 102 may also include a pair of draw latch slots 116 to allow hook ends 118 of the pair of draw latches 106 to pass therethrough from the first hinge half 100 to the second hinge half 102 to engage the respective draw latch saddles 112 when the combination bunk/hinge assembly 68 is secured in the in use position, with the extension bed member 64 extended. In an embodiment, the length of the hook ends 118 in the draw latches 106 may be adjustable. The second hinge half 102 may also include attachment flanges 120 configured to attach the combination bunk/hinge assembly 68 to the extension bed member 64.

Figure 13:
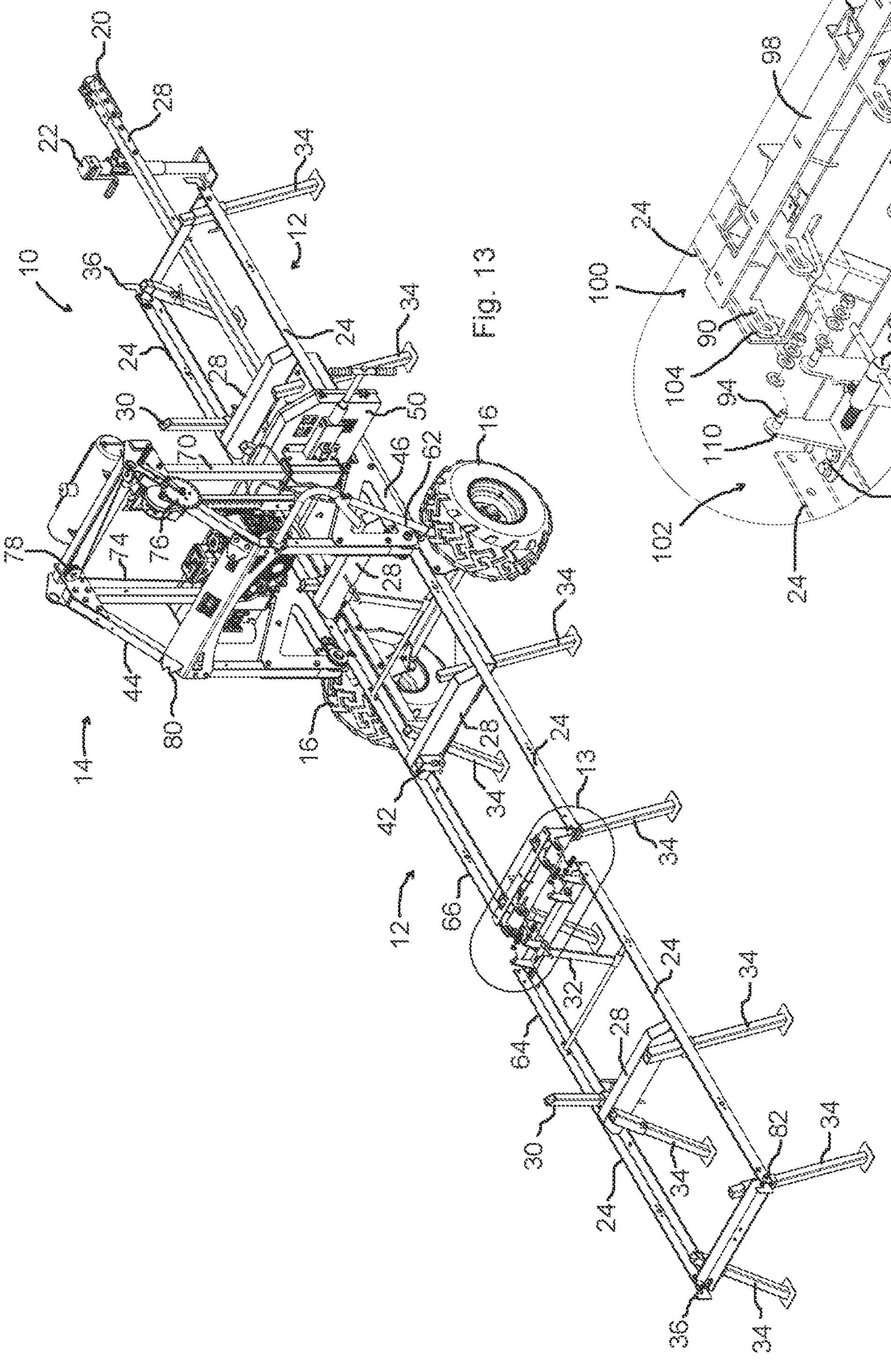
FIG. 13 is a perspective view showing the extension bed member side bunk/hinge member and the main bed member side bunk/hinge member of FIG. 11, attached to an extension bed member, and a main bed member, respectively, of the sawmill of FIG. 3, ready for pivotably attaching the extension bed member to the main bed member.
Figure 14:
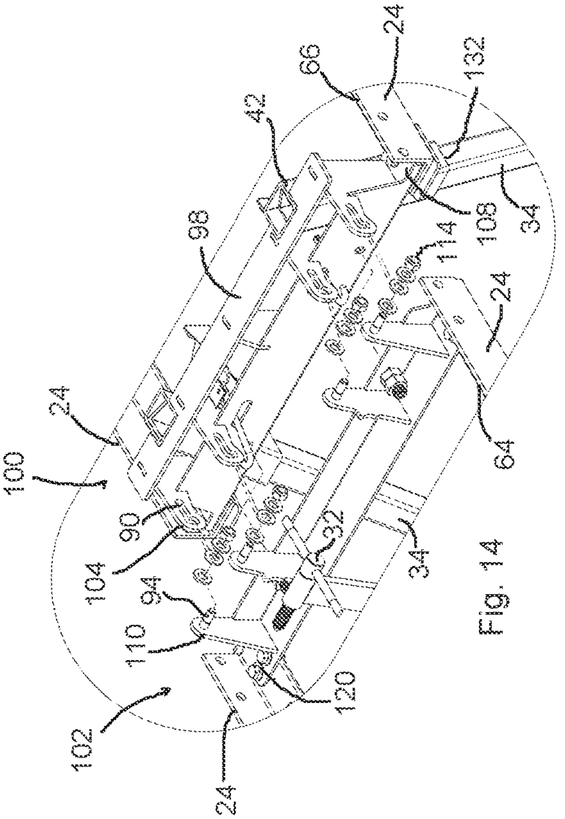
FIG. 14 is an enlarged detail of FIG. 13.

As best seen in FIGS. 13 and 14, the first hinge half 100 may be attached to the main bed member 66, and the second hinge half 102 may be attached to the extension bed member 64, and the first and second hinge halves 100, 102 may be attached together by threading nuts 114 on to threaded hinge pins 94.

Embodiments of the present invention utilize fasteners, such as threaded bolts and nuts, which may be provided as a kit for the operator to assemble with simple tools. However, it will be appreciated that other manners of attaching components together will be known to persons skilled in the art, including welding, and riveting, for example. All such embodiments are comprehended by the present invention.

Additionally, the combination bunk/hinge assembly 68 may include projections, such as a tapered end set screws 122, on the second hinge half 102 for engaging mating cavities or openings 124 in the first hinge half 100, when the combination bunk/hinge assembly 68 is in the in use position. The tapered end set screws 122 and mating openings 124 may be sized, shaped and positioned to guide into and lock the relative vertical and/or lateral positions of the first and second hinge halves 100, 102, when the combination bunk/hinge assembly 68 is unfolded and secured into the in use position. In this way, the tapered end set screws 122 and openings 124 may be used to ensure that the extension bed member 64 and its rails 24 are aligned with the main bed member 66 and its rails 24 when the extension bed member 64 is unfolded and secured into the in use position with the draw latches 106. It is contemplated that the positions of the tapered end set screws 122 and openings 124 may be reversed, such that all of the tapered end set screws 122 are on the second hinge half 102, and all of the openings 124 are on the first hinge half 100. It is also contemplated that tapered end set screws 122 may be positioned in both the first and the second hinge halves 100, 102, with the openings 124 positioned in matching relation in both the first and second hinge halves 100, 102.

In an embodiment, the length that the tapered end set screws 122 project outwardly from the first hinge half 100 is adjustable. By way of example, the tapered end set screws 122 may be threaded and carried in a threaded bore on the first hinge half 100 whereby tightening or loosening the tapered end set screws 122 causes them to extend or retract relative to the respective opening 124 on the second hinge half 102. In an embodiment, the adjustment of each tapered end set screw 122 may be secured with a pair of jam nuts 126.

It is contemplated that projections and cavities or openings 124 may be omitted according to other embodiments of the present invention. Furthermore, other forms of projections than the tapered ended set screws 122 disclosed herein may be used as will now be appreciated by persons skilled in the art. All such embodiments are comprehended by the present invention.

Figure 15:
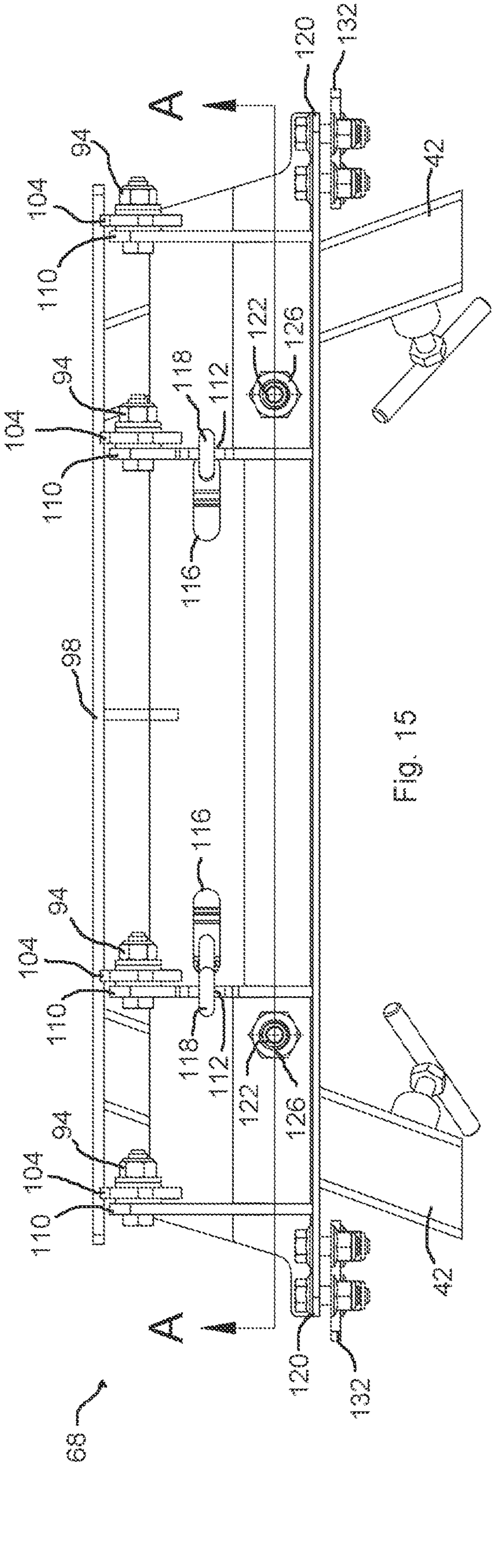
FIG. 15 is rear view of the combination bunk/hinge assembly of FIG. 10.
Figure 16:
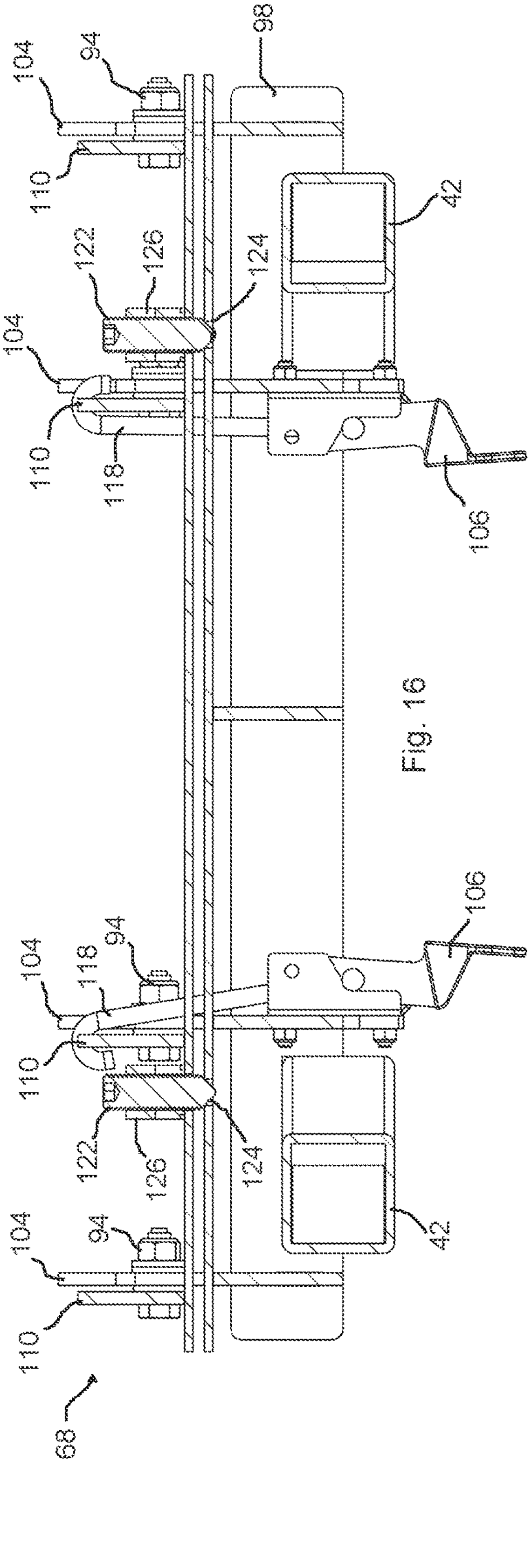
FIG. 16 is a cross-sectional view of the combination bunk/hinge assembly of FIG. 15 taken along line A-A.

With reference now to FIGS. 15 and 16, the draw latches 106 of an embodiment are arranged and configured so that their hook ends 118 engage the respective draw latch saddles 112 on the second hinge members 110, to draw the second hinge half 102 towards the first hinge half 100, to seat the tapered end set screws 122 in the respective openings 124, and also to draw at least one of the second hinge members 110 towards the adjacent first hinge member 104. In this way, the draw latches 106, in combination with the draw latch saddles 112, the tapered end set screws 122, and the openings 124 help to secure the first and second hinge halves 100, 102 together, when the combination bunk/hinge assembly 68 is in the in use position. This helps ensure that the extension bed member 64 and its rails 24 are aligned with the main bed member 66 and its rails 24 when the extension bed member 64 is folded out and secured in the in-use position.

Figure 17:
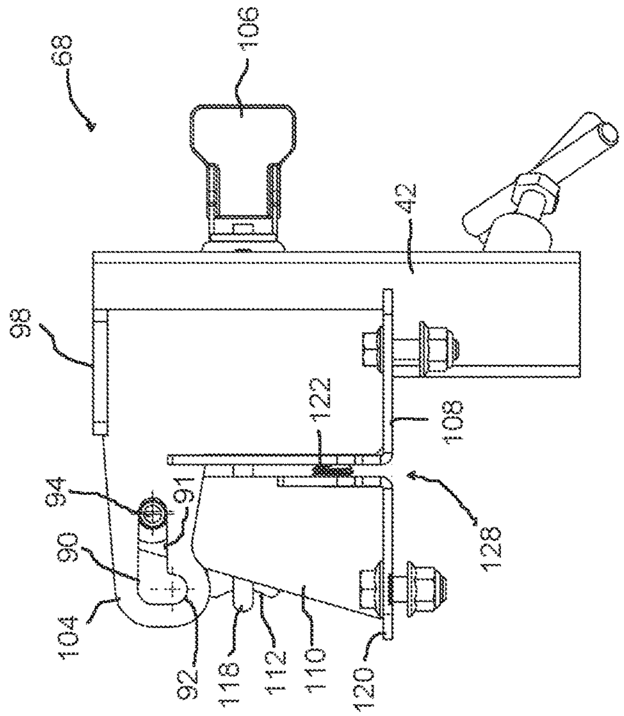
FIG. 17 is a side view of the combination bunk/hinge assembly of FIG. 10.

With reference now to FIG. 17, it can be seen that the engagement of the hinge slots 90 by the hinge pins 94 on the one hand, and the engagement of the openings 124 by the tapered end set screws 122 on the other hand, regulate the space 128 between the first and second halves 100, 102 of the combination bunk/hinge assembly 68, according to an embodiment of the present invention. As will be appreciated, increasing or decreasing the space 128 will cause a corresponding increase or decrease to the angle of the extension bed member 64 relative to the main bed member 66, when the combination bunk/hinge assembly 68 is secured in the in use configuration.

Figure 18:
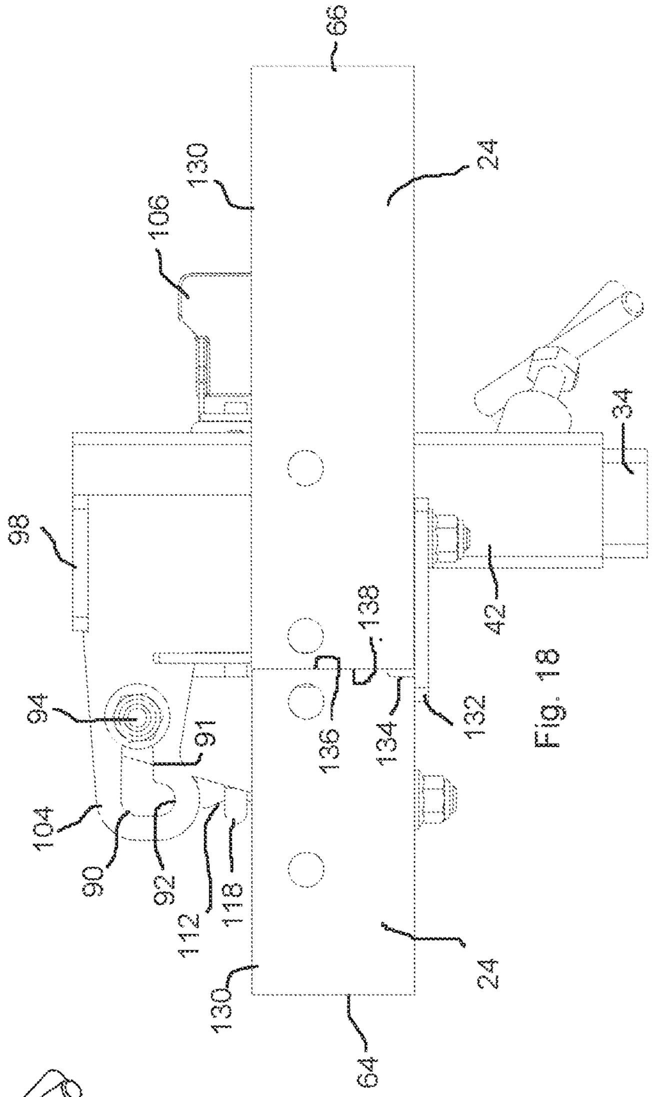
FIG. 18 is a side view of the combination bunk/hinge assembly of FIG. 17 with rails attached to the extension bed member side hinge member, and the main bed member side hinge member.

In FIG. 18, for example, the combination bunk/hinge assembly 68 is shown secured in the in use configuration after being adjusted so that the extension bed member 64 and the main bed member 66 are aligned, and the tops 130 of the rails 24 of the extension bed member 64 are level with, and at the same height, as the tops 130 of the rails 24 of the main bed member 66. Furthermore, the rails 24 of the extension bed member 64 and the rails 24 of the main bed member 66 are also laterally aligned, as best seen in FIG. 2, for example.

With continued reference to FIG. 18, rail support members 132 may be attached to the main bed member 66 underneath the rails 24 to extend out from the main bed member 66, as shown. The rail support members 132, which may be provided as rigid plates, help align the rails 24 of the extension bed member 64 and the rails 24 of the main bed member 66, and guide the extension bed member 64 into position against the main bed member 66, when the operator is unfolding and securing the combination bunk/hinge assembly 68 with the extension bed member 64 in the in use position. When the rail support members 132 are present, the slide portions 91 of the hinge slots 90 will each have a length that is at least the length by which the rail support members 132 extend out from the main bed member 66. This allows the rails 24 of the extension bed member 64 to be pulled clear of the rail support members 132 by the operator, before the hinge pins 94 drop into the respective detents 92.

Additionally, notches 134 may be provided in the ends 136 of the rails 24 of the extension bed member 64 abutting the ends 138 of the rails 24 of the main bed member 66. The notches 134 are sized and shaped to help ensure that the ends 136 and 138 abut squarely with one another. In other words, the notches 134 extend across the entire length of the horizontal portion of the “L” beam forming each rail 24 of the extension bed member 64, ensuring that the vertical portion of the “L” beam forming each rail 24 of the extension bed member 64 contacts the respective vertical portion of the “L” beam forming each rail 24 of the main bed member 66. The horizontal portions of the “L” beams are set back from the respective vertical portions, thereby avoiding contact between the horizontal portions of the ends 136 and 138.

Figure 19:
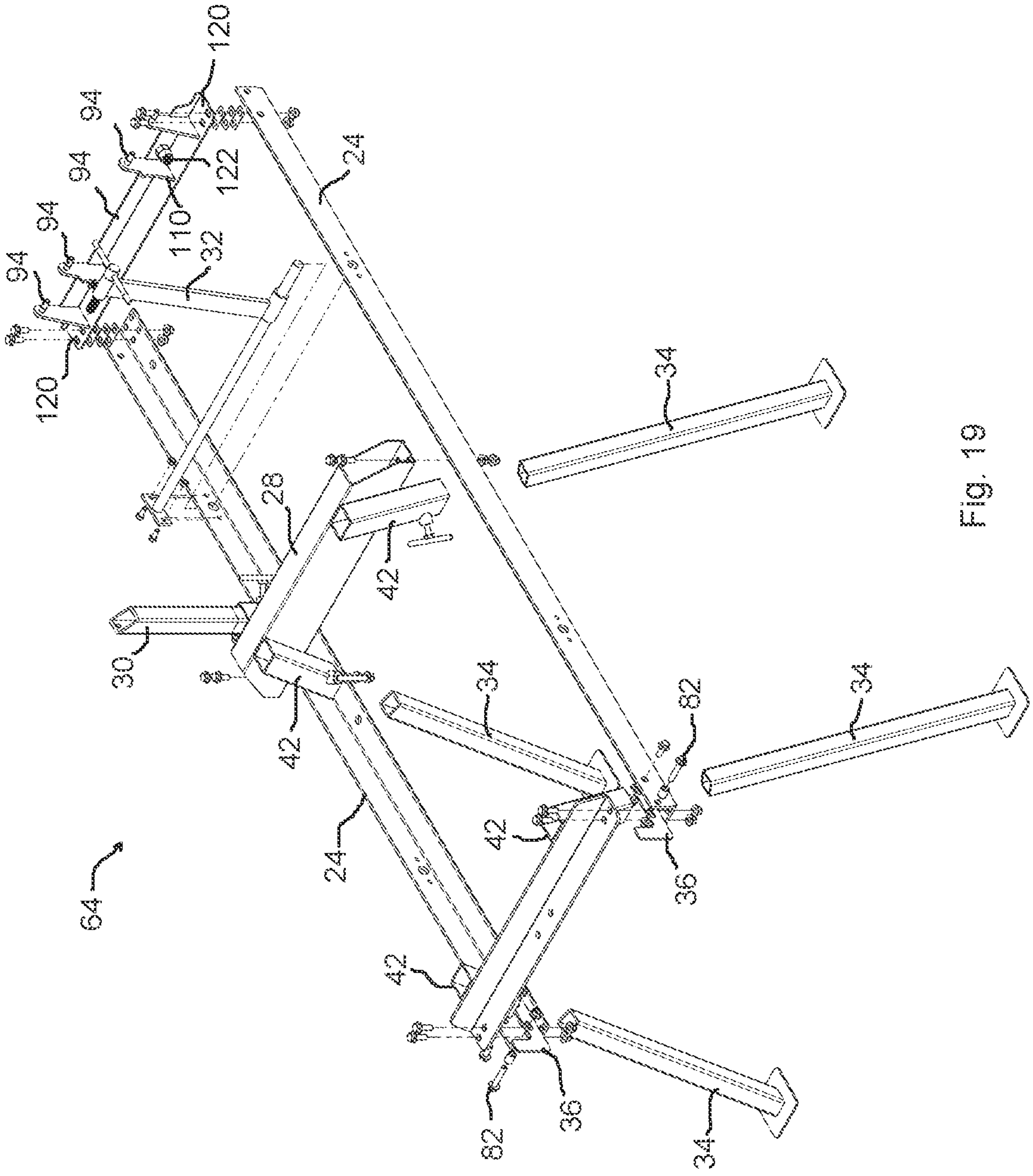
FIG. 19 is an exploded perspective view of the extension bed member of FIG. 1.

With reference to FIG. 19, the extension bed member 64 may be configured as a kit of parts, to be assembled by the operator without the need for specialized tools.

In an embodiment, the hinge slots 90 have a slide portion 91, adapted to allow the hinge pin 94 to slide there along, so that the second part of the hinge assembly may be pulled away from the first part by a predetermined distance. In an embodiment, the hinge slots 90 may also have a pivot portion extending from the slide portion 91, sized and shaped to hold the hinge pin 94 from sliding while the extension bed member 64 is being unfolded from the stowed position into the in use position, and vice versa. In an embodiment, the pivot portion is a curved section oriented to allow the hinge pin 94 to drop into it, when the second hinge half 102 of the hinge assembly is pulled away from the first hinge half 100 during unfolding of the track extension from the stowed position to the in use position. In this regard, the hinge slot 90 may be generally L-shaped.

Good results have been obtained by providing the curved portions of the detents 92 with curvatures that are greater than the curvatures of the curved portions of the hinge pins 94, and providing each slide portion 91 with a length of at least half a diameter of the respective hinge pin 94. By way of example, with a hinge pin 94 having a diameter of 11 mm, the length of the slide portion 91 of the respective hinge slot 90 may be at least 5.5 mm, and good results have been obtained with a length of 2.3 cm. Accordingly, 2 cm to 10 cm is generally a good range for the lengths of the slide portions 91.

Having described embodiments of the sawmill apparatus 10, including a combination bunk/hinge assembly 68, it can now be understood how the sawmill apparatus 10 shown in FIGS. 1 and 2 may be prepared for transport to or from a work site, as shown in FIG. 4. For example, the operator may start by unlatching the draw latches 106. Next, the operator may lower the saw head 50 to a bottom position and move the carriage assembly 14 along the bed 12 to the travel position, shown in FIGS. 1 and 2. Once in the carriage assembly 14 is in the travel position, the operator may insert the locking pins 86 through the apertures 88 to lock the carriage assembly 14 in place on the rails 24. Next, the operator may pull the extension bed member 64 away from the main bed member 66 to slide the hinge pins 94 along the slide portion 91 of the hinge slot 90 until they drop into the detents 92. The operator may then fold the extension bed member 64 back towards the carriage assembly 14 by pivoting the extension bed member 64 until its striker pegs 82 engage the catch members 80 and are guided into their resting positions by the tapered slots 84. Next, the operator may proceed to wrap the ratchet strap 96 around the one end 38 of the extension bed member 64 and a log bunk 28 located below, to secure the one end 38 to the carriage assembly 14. Finally, the operator may connect the hitch 20 to a hitch coupler on a tow vehicle, and raise up all adjustable feet 34, and lift and rotate the trailer jack 22 off the ground.

Similarly, to prepare the sawmill shown in FIG. 4 for use, as shown in FIGS. 1 and 2, the operator may take the following steps. For example, the operator may start by rotating and lowering the trailer jack 22 to contact the ground and unhitch the hitch 20 from the hitch coupler on the tow vehicle. Next, the operator may continue to crank the trailer jack 22 to lift the tongue 18 so that the adjustable feet 34 in the main bed member 66 can be lowered. Next, the operator may place a level across the rails 24 at the other end 40 and maneuver the sawmill apparatus 10 until the main bed member 66 is laterally level. Once the main bed member 66 is laterally level, the operator may secure the adjustable feet 34 in position. Next, the operator may detach the trailer jack 22 from the tongue 18 and attach it to the rear end of the main bed member 66. After placing a level across the log bunks 28 at the rear end of the main bed member 66, parallel to the rails 24, the operator may crank the trailer jack 22 to lift the rear end of the main bed member 66 until the main bed member 66 is longitudinally level. Next, the operator may lower the adjustable feet 34 at the rear end of the main bed member 66 and secure them in position, using the T-handles provided at holders 42. Having set up the adjustable feet 34 in the main bed member 66, the operator may remove the ratchet strap 96, and unfold the extension bed member 64 by pivoting the extension bed member 64 away from the carriage assembly 14, with the hinge pins 94 being held in the detents 92 of the hinge slots 90, until the extension bed member 64 is in an extended, substantially horizontal position. At this point, the operator may push the extension bed member 64 towards the main bed member 66 to pop the hinge pins 94 out of the detents 92 to slide along the slide portions 91 of the hinge slots 90 until the second hinge half 102 presses against the first hinge half 100. The operator may then secure the combination bunk/hinge assembly 68 with the draw latches 106. Next, the operator may place a level longitudinally across the bunk surface 98 of the combination bunk/hinge assembly 68 bunk, and the rear most log bunk 28 on the main bed member 66, and adjust the adjustable feet 34 until the extension bed member 64 is level with the main bed member 66. Finally, the operator may reattach the trailer jack 22 back on the tongue 18.

While reference has been made to various embodiments of the invention, other variations, implementations, modifications, alterations, and embodiments are comprehended by the broad scope of the appended claims. Some of these have been discussed in detail in this specification and others will be apparent to those skilled in the art. Those of ordinary skill in the art having access to the teachings herein will recognize these additional variations, implementations, modifications, alterations and embodiments, all of which are within the scope of the present invention, which invention is limited only by the appended claims.

What is claimed is:

1. A sawmill assembly, comprising:

a bed, including a main bed member and an extension bed member, each said main bed member and said extension bed member having a pair of substantially parallel rails;

a log bunk attached to said main bed member, said log bunk having a support surface configured to support a first portion of a workpiece material; and a hinge assembly pivotably connecting an end of said extension bed member to an end of said main bed member;

wherein said hinge assembly has a first part pivotably connected to a second part to permit said extension bed member to pivot relative to said main bed member between an extended, in use position, and a stowed position;

wherein when said extension bed member is in said in use position, said hinge assembly defines a support surface configured to support a second portion of said workpiece material; and wherein the support surface of the hinge assembly extends between the parallel rails.

2. The sawmill assembly as claimed in claim 1, wherein said in use position is defined by a longitudinal axis of said extension bed member extending substantially parallel to a longitudinal axis of said main bed member.

3. The sawmill assembly as claimed in claim 2, wherein said in use position is further defined by wheel contacting support surfaces of said rails of said extension bed member being aligned with wheel contacting surfaces of said rails of said main bed member.

4. The sawmill assembly as claimed in claim 3, wherein said rails are L-shaped in cross-section, defining vertical portions comprising said wheel contact support surfaces, and horizontal portions for attachment to said main bed member and said extension bed member, respectively.

5. The sawmill assembly of claim 4, wherein when said extension bed member is in said in use position, end surfaces of said rails at said end of said extension bed member abut end surfaces of said rails at said end of said main bed member;

wherein said vertical portions of said end surfaces contact one another; and wherein said horizontal portions of said end surfaces are set back from said respective vertical portions, to avoid contact between said horizontal portions of said end surfaces.

6. The sawmill assembly as claimed in claim 2, wherein said rails of said extension bed member are spaced apart by a first distance, and said rails of said main bed member are spaced apart by a second distance; and wherein one of a) said first distance and said second distance are the same, and b) said first distance and said second distance are different.

7. The sawmill assembly as claimed in claim 6, wherein said support surface of said hinge assembly spans one of a) at least 50% of said first distance or said second distance, b) at least 90% of said first distance or said second distance, and c) greater than said first distance or said second distance.

8. The sawmill assembly as claimed in claim 1, wherein said stowed position is defined by a longitudinal axis of said extension bed member being at an angle to a longitudinal axis of said main bed member.

9. The sawmill assembly as claimed in claim 8, wherein said angle is 0°-90°.

10. The sawmill assembly as claimed in claim 1, wherein when said extension bed member is in said in use position, said support surface of said hinge assembly is substantially level with said support surface of said log bunk.

11. The sawmill assembly as claimed in claim 1, wherein said workpiece material is a log.

12. The sawmill assembly as claimed in claim 1, further comprising a carriage having carriage wheels movably supported along said rails of said main bed member, and said extension bed member, when said extension bed member is in said in use position;

wherein said carriage is configured to mount a saw head.

13. The sawmill assembly as claimed in claim 12, further comprising a latch for releasably securing the other end of said extension bed member to said carriage assembly, when said extension bed member is in said stowed position.

14. The sawmill assembly as claimed in claim 13, wherein said latch comprises one of a catch member and a striker peg on said other end of said extension bed member, and the other of said catch member and said striker peg on said carriage.

15. The sawmill assembly as claimed in claim 14, further comprising a means for securing said other end of said extension bed member to said carriage assembly, with said striker peg engaging said catch member.

16. The sawmill assembly as claimed in claim 12, further comprising a locking pin to releasably lock said carriage assembly in a predetermined position relative to said main bed member, when said extension bed member is in said stowed position.

17. The sawmill assembly as claimed in claim 13, wherein said latch is configured, and positioned on said carriage assembly such that when said extension bed member is in said stowed position, and said other end of said extension bed member is secured to said carriage assembly by said latch, said extension bed member braces said carriage assembly to help prevent said carriage assembly from tipping over in a direction along a longitudinal axis of the main bed member.

18. The sawmill assembly as claimed in claim 17, wherein said carriage, a portion of said main bed member extending between said carriage and said hinge assembly, and said extension bed member together form a triangle, when said extension bed member is in said stowed position.

19. The sawmill assembly as claimed in claim 1, further comprising a pair of wheels operably attached to said main bed member, to allow said sawmill assembly to be transported to or from a worksite with a tow vehicle.

20. The sawmill assembly as claimed in claim 1, further comprising at least one rail support member attached to said end of said main bed member, and arranged to support ends of said rails of said extension bed member adjacent to said end of said main bed member, to help vertically align wheel contacting surfaces of said rails of said extension bed member with wheel contacting surfaces of said main bed member, when said extension bed member is in said in use position.

21. The sawmill assembly as claimed in claim 1, wherein one of said first part or said second part of said hinge assembly comprises at least one holder for slidably retaining an adjustable foot.

22. The sawmill assembly as claimed in claim 1, wherein one of said first part and said second part of said hinge assembly comprises at least one draw latch for releasably securing the other of said first part and said second part thereto, when said extension bed member is in said in use position.

23. The sawmill assembly as claimed in claim 22, wherein said at least one draw latch has a hook configured to engage a corresponding saddle on said other of said first part and said second.

24. The sawmill assembly as claimed in claim 1, wherein one of said first part and said second part of said hinge assembly comprises at least one projection for engaging a mating opening or cavity in the other of said first part and said second part, when said extension bed member is in said in use position, to lock a vertical position and a lateral position of said first part relative to said second part.

25. The sawmill assembly as claimed in claim 24, wherein a length of said projection projecting from said one of said first part and said second part is adjustable.

26. The sawmill assembly as claimed in claim 25, wherein said at least one projection is an adjustable set screw having a tapered end for engaging said mating opening or cavity.

27. The sawmill assembly as claimed in claim 1, wherein one of said first part and said second part of said hinge assembly comprises at least one hinge slot, and the other of said first part and said second part comprises a hinge pin slidably retained in said at least one hinge slot to allow said first part and said second part to be separated from one another by a predetermined distance.

28. The sawmill assembly as claimed in claim 27, wherein said at least one hinge slot includes a slide portion for said hinge pin to slide along as said first part and said second part are separated, and a detent for said hinge pin to engage when said first part and said second part are fully separated by said predetermined distance; and wherein said detent provides a shoulder for said hinge pin to bear against when said extension bed member is pivoted between said in use position and said stowed position.

29. The sawmill assembly as claimed in claim 28, wherein said at least one hinge slot is L-shaped.

30. The sawmill assembly as claimed in claim 28, wherein said detent comprises a curved portion at an end of said slide portion;

wherein said hinge pin has a curved portion configured to engage said curved portion of said detent; and wherein said curved portion of said detent has a curvature greater than a curvature of said curved portion of said hinge pin.

31. The sawmill assembly as claimed in claim 28, wherein said slide portion has a length of at least half a diameter of said hinge pin.

32. The sawmill assembly as claimed in claim 1, wherein one of said first part and said second part of said hinge assembly comprises a flange for attaching to said main bed member, and the other of said first part and said second part comprises a flange for attaching to said extension bed member.

33. A hinge assembly for a sawmill assembly having a main bed member, and a log bunk attached to said main bed member, said log bunk having a support surface configured to support a first portion of a workpiece material, said hinge assembly comprising:

a first part configured for attachment to one of said main bed member and an extension bed member; and a second part configured for attachment to the other of said main bed member and said extension bed member;

wherein said first part is pivotably connected to said second part to permit said extension bed member to pivot relative to said main bed member between an extended, in use position, and a stowed position, when said hinge assembly is operably attached to said main bed member and said extension bed member;

wherein when said extension bed member is in said in use position, said hinge assembly defines a support surface configured to support a second portion of said workpiece material; and wherein the support surface of the hinge assembly extends between the parallel rails.

34. The hinge assembly as claimed in claim 33, wherein said rails of said extension bed member are spaced apart by a first distance, and said rails of said main bed member are spaced apart by a second distance; and wherein one of a) said first distance and said second distance are the same, and b) said first distance and said second distance are different; and wherein said in use position is defined by a longitudinal axis of said extension bed member extending substantially parallel to a longitudinal axis of said main bed member; and wherein said support surface of said hinge assembly spans one of a) at least 50% of said first distance or said second distance, and b) at least 90% of said first distance or said second distance.

35. The hinge assembly as claimed in claim 33, wherein said support surface of said hinge assembly is attached to said first part or said second part so that said support surface will be substantially level with said support surface of said at least one log bunk when said extension bed member is in said in use position.

36. The hinge assembly as claimed in claim 33, wherein one of said first part and said second part comprises at least one hinge slot, and the other of said first part and said second part comprises a hinge pin slidably retained in said at least one hinge slot to allow said first part and said second part to be separated from one another by a predetermined distance.

37. The hinge assembly as claimed in claim 36, wherein said at least one hinge slot includes a slide portion for said hinge pin to slide along as said first part and said second part are separated, and a detent for said hinge pin to engage when said first part and said second part are fully separated by said predetermined distance; and wherein said detent provides a shoulder for said hinge pin to bear against when said extension bed member is pivoted between said in use position and said stowed position.

38. The hinge assembly as claimed in claim 37, wherein said at least one hinge slot is L-shaped.

39. The hinge assembly as claimed in claim 37, wherein said detent comprises a curved portion at an end of said slide portion;

wherein said hinge pin has a curved portion configured to engage said curved portion of said detent; and wherein said curved portion of said detent has a curvature greater than a curvature of said curved portion of said hinge pin.

40. The hinge assembly as claimed in claim 37, wherein said slide portion has a length of at least half a diameter of said hinge pin.

41. The hinge assembly as claimed in claim 37, wherein one of said first part and said second part of said hinge assembly comprises a flange for said attachment to said main bed member, and the other of said first part and said second part comprises a flange for said attachment to said extension bed member.

42. A method of sawing a workpiece material, said method comprising the steps of:

providing a sawmill assembly as claimed in claim 12;

mounting said saw head to said carriage;

unfolding said extension bed member from said stowed position to said extended, in use position;

leveling said surface of said hinge assembly with said surface of said log bunk;

supporting said first portion of said workpiece material with said support surface of said log bunk;

supporting said second portion of said workpiece material with said support surface of said hinge assembly; and moving said carriage along said bed to engage said workpiece material with a saw blade of said saw head, while said saw head is operating.

43. The method of sawing a workpiece material as claimed in claim 42, wherein said workpiece material is a log.

* * * * *